(12) United States Patent
Schneider

(10) Patent No.: US 11,567,181 B2
(45) Date of Patent: Jan. 31, 2023

(54) METHOD FOR DETECTING A FUNCTIONAL IMPAIRMENT OF A LASER SCANNER, LASER SCANNER, AND MOTOR VEHICLE

(71) Applicant: VALEO Schalter und Sensoren GmbH, Bietigheim-Bissingen (DE)

(72) Inventor: Stefan Schneider, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 1270 days.

(21) Appl. No.: 16/060,562

(22) PCT Filed: Nov. 30, 2016

(86) PCT No.: PCT/EP2016/079241
§ 371 (c)(1),
(2) Date: Nov. 12, 2018

(87) PCT Pub. No.: WO2017/097654
PCT Pub. Date: Jun. 15, 2017

(65) Prior Publication Data
US 2019/0064330 A1    Feb. 28, 2019

(30) Foreign Application Priority Data
Dec. 9, 2015    (DE) .......................... 102015121415.6

(51) Int. Cl.
*G01S 7/497* (2006.01)
*G01S 17/42* (2006.01)
(Continued)

(52) U.S. Cl.
CPC .............. *G01S 7/497* (2013.01); *G01S 17/10* (2013.01); *G01S 17/42* (2013.01); *G01S 17/931* (2020.01); *G01S 2007/4975* (2013.01)

(58) Field of Classification Search
CPC .................. G01S 17/00; G01S 117/04; G01S 2007/4975; G01S 17/02; G01S 17/93;
(Continued)

(56) References Cited

U.S. PATENT DOCUMENTS 9,470,520 B2 * 10/2016 Schwarz ............... G01S 7/4808
356/4.07
2004/0257556 A1   12/2004 Samukawa et al.
(Continued)

FOREIGN PATENT DOCUMENTS

DE   196 52 440 A1   6/1998
DE   197 17 399 A1   6/1999
(Continued)

OTHER PUBLICATIONS

International Search Report issued in PCT/EP2016/079241 dated Jan. 27, 2017 (3 pages).
(Continued)

*Primary Examiner* — Yuqing Xiao
*Assistant Examiner* — Benjamin Richard Hebert
(74) *Attorney, Agent, or Firm* — Osha Bergman Watanabe & Burton LLP

(57) ABSTRACT

The invention relates to a method for detecting a functional impairment of a laser scanner (2) of a motor vehicle (1), in which a laser beam (12) of the laser scanner (2) is transmitted through a protective screen (6) of the laser scanner (2) into a surrounding area (4) of the motor vehicle (1), wherein an echo (16) of the transmitted laser beam (12) at least partially reflected at the protective screen (6) is received by a reception unit (9) of the laser scanner (2) with an intensity value (19), and the functional impairment of the laser scanner (2) is detected if the intensity value (19) is different from a reference intensity value.

12 Claims, 6 Drawing Sheets

(51) Int. Cl.
*G01S 17/931* (2020.01)
*G01S 17/10* (2020.01)

(58) Field of Classification Search
CPC ........ G01S 7/497; G01S 17/10; G01S 17/931; G01S 17/42
See application file for complete search history.

(56) References Cited

U.S. PATENT DOCUMENTS

| | | | |
|---|---|---|---|
| 2008/0210881 A1* | 9/2008 | Harris | G01S 17/95 250/395 |
| 2012/0113410 A1 | 5/2012 | Iwasawa et al. | |
| 2013/0314694 A1* | 11/2013 | Tchoryk, Jr. | G01S 17/58 356/28.5 |

FOREIGN PATENT DOCUMENTS

| | | |
|---|---|---|
| DE | 10149 768 A1 | 4/2003 |
| DE | 10 2008 032 216 A1 | 1/2010 |
| EP | 1302784 A2 * 10/2002 | ............ G01S 17/95 |
| EP | 1 302 784 A2 | 4/2003 |
| EP | 1 378 763 B1 | 4/2009 |
| EP | 2 189 815 A1 | 5/2010 |
| EP | 2 455 780 A1 | 5/2012 |
| JP | 2005010094 A | 1/2005 |
| JP | 2010175278 A | 8/2010 |
| JP | 2011022080 A | 2/2011 |

OTHER PUBLICATIONS

Written Opinion of the International Searching Authority issued in PCT/EP2016/079241 dated Jan. 27, 2017 (7 pages).
German Search Report issued in DE 10 2015 121 415.6 dated Jul. 28, 2016 (12 pages).
The Notice of Preliminary Rejection issued in corresponding Korean Application No. 10-2018-7019404, dated Oct. 28, 2019 (17 pages).
The Notice of Reason for Rejection issued in corresponding Japanese Application No. 2018-530042, dated Jul. 30, 2019 (14 pages).

* cited by examiner

METHOD FOR DETECTING A FUNCTIONAL IMPAIRMENT OF A LASER SCANNER, LASER SCANNER, AND MOTOR VEHICLE

The invention relates to a method for detecting a functional impairment of a laser scanner of a motor vehicle. A laser beam of the laser scanner is transmitted through a protective screen of the laser scanner into a surrounding area of the motor vehicle. The invention also relates to a laser scanner for a motor vehicle and to a motor vehicle having a laser scanner.

Methods for detecting a functional impairment of a laser scanner are known from the prior art. Thus, EP 1 378 763 B1 shows a laser scanning apparatus having a transmission unit that has an impulse laser for transmitting a beam of light into an area to be monitored, having a light deflection unit in order to steer the beam of light transmitted by the impulse laser into the area to be monitored, having a reception unit for receiving light pulses reflected from an article situated in the area to be monitored, and having a front screen that is transmissive for the beam of light and isolates the transmission, reception and light deflection units from the surroundings of the laser scanning apparatus. In the area of the front screen in which the beam of light passes through the front screen, there is an optical element provided in order to branch off a partial beam from the beam of light emerging from the laser scanning apparatus. A photodetector is used to measure the intensity of the branched-off partial beam.

It is an object of the invention to provide a method, a laser scanner and a motor vehicle by means of which or in the case of which a functional impairment of a laser scanner can be detected with little complexity.

This object is achieved according to the invention by a method, by a laser scanner and by a motor vehicle having the features according to the respective independent claims.

A method according to the invention involves a functional impairment of a laser scanner of a motor vehicle being detected. A laser beam of the laser scanner is transmitted through a protective screen of the laser scanner, which protective screen is at least semitransparent in particular in the frequency range of the laser beam, into a surrounding area of the motor vehicle, in particular by means of a transmission unit of the laser scanner. A fundamental concept of the invention can be seen in that an echo of the transmitted laser beam at least partially reflected at the protective screen is received by a reception unit of the laser scanner with an intensity value, and the functional impairment of the laser scanner is detected if the intensity value is different from a reference intensity value.

Use of the echo arising at the protective screen allows the functional impairment of the laser scanner to be detected with fewer components and therefore less complexity.

In contrast to the prior art, the method according to the invention can involve the functional impairment of the laser scanner being detected without a separate optical element arranged in the area of the front screen. There is thus no need for a separate reference destination and in particular a separate reception unit for receiving a partial beam branched off from an emerging beam of light by the optical element. Additionally, it is not necessary to provide further optical elements in the laser scanner that produce a specific reference beam in order to detect the functional impairment.

The method according to the invention involves the backscatter partially produced for the laser beam at the protective screen being used to detect the functional impairment of the laser scanner or to confirm a functional status of the laser scanner. The backscatter from the protective screen or the echo of the transmitted laser beam at least partially reflected at the protective screen usually arises undesirably in this case and is now used in the method according to the invention to detect the functional impairment.

The protective screen may be configured as a cover or as part of a housing of the laser scanner, for example. The protective screen in particular prevents particles from outside the housing of the laser scanner entering an inside of the housing of the laser scanner. This allows components inside the laser scanner to be protected against soiling or damage, for example.

The laser scanner is preferably configured to have a reception unit having multiple reception channels. Accordingly, the laser beam can be transmitted into the surrounding area and multiple echos of the transmitted laser beam can be received and processed. One of these echos is then the echo of that component of the laser beam that is reflected at the protective screen, for example. On the basis of the intensity of the echo of the laser beam that is at least reflected at the protective screen, it is then possible to detect whether the function of the laser scanner is impaired. For this purpose, the intensity value is compared with the reference intensity value. If the intensity value is different from the reference intensity value, it is assumed that the laser scanner is functionally impaired.

In particular, there is provision for the echo to be assigned as the echo reflected from the protective screen on the basis of its delay from a transmission unit of the laser scanner, which transmits the laser beam, to the protective screen and back to a reception unit of the laser scanner. It is thus possible for the echo to be distinguished from further echos of the transmitted laser beam by virtue of the delay in the laser beam between the transmission unit and the reception unit via the protective screen being used. The distance that the laser beam covers between the transmission unit and the reception unit via the protective screen is known, in particular. It is thus advantageous that the echo can be assigned to the echo reflected from the protective screen more easily and effectively on the basis of its delay.

Preferably, there is provision for the functional impairment detected to be a deposit of particles on the protective screen if the intensity value is greater than the reference intensity value. The deposit of particles on the protective screen results in particular in the laser beam transmitted by the transmission unit being reflected at the protective screen to a greater extent than would be the case with a deposit-free protective screen. For this purpose, the intensity value increases in particular if the deposit of the particles is present on the protective screen. The deposit of the particles is present in particular on an outer side, the side facing the surrounding area, of the protective screen. The deposit may alternatively be present on an inner side of the protective screen and can be detected there. The protective screen is preferably provided as isolation between the surrounding area and the inner housing of the laser scanner. As a result, the protective screen is then in particular no longer protected against soiling or deposit of the particles from the surrounding area. It is thus advantageous that the intensity value can be used to infer the cause of the functional impairment.

In a further embodiment, there is preferably provision for the deposit of the particles in a first area of the protective screen to be detected if a deflection mirror of the laser scanner is oriented in a first position, and for the deposit of the particles in a second area of the protective screen to be detected if the deflection mirror is oriented in a second position, which is different from the first position. The deflection mirror radiates the laser beam of the laser scanner to a different location in the surrounding area each time. The orientation of the deflection mirror from the first position to the second position also radiates the laser beam through different areas of the protective screen, however. As such, the respective position of the deflection mirror can be used to determine the respective area of the protective screen through which the laser beam currently passes. For this area, it is then possible to detect the deposit of the particles. It is thus advantageous that the deposit of the particles is not only detected but can also be spatially assigned on the protective screen.

As an additional preference, there is provision for the laser beam to be reflected at a deflection mirror of the laser scanner at least after transmission, and for the functional impairment to be that the deflection mirror is detected as tarnished, in particular with moisture, if the intensity value is less than the reference intensity value. If the deflection mirror is now tarnished with moisture, for example, then this results in the laser beam being reflected at the deflection mirror more diffusely or more undirectionally than would be the case with an untarnished deflection mirror. As a result, the laser beam has, following reflection at the deflection mirror, a lower intensity value than would be the case with an untarnished deflection mirror. If the laser beam now reaches the protective screen, and is partially reflected there, after the deflection mirror, for example, then the first echo also has a lower intensity value than if the deflection mirror were untarnished as a result of a lower intensity already having arrived from the deflection mirror. It is advantageous that the intensity value allows inference of the type of functional impairment, in the present case the tarnished deflection mirror.

In a further embodiment, there is provision for at least one further echo of the transmitted laser beam reflected at an object in the surrounding area to be received by the reception unit with a further intensity value. The reception unit is thus preferably configured to have at least two reception channels as a result. It is thus possible for the echo and the further echo to be received and processed by the reception unit. As a result, in particular no further reception unit is necessary for processing the further echo. It is also advantageous that this means that the echo can be received during the operational mode of the laser scanner. This in turn allows the functional impairment to be detected during the operational mode of the laser scanner and hence of the motor vehicle. The at least one further echo thus allows the laser scanner to provide a distance from the object in the surrounding area, while the same laser beam as is used for the distance measurement for the object in the surrounding area can also be used to determine the intensity value that is compared with the reference intensity value and provides information about the functional status of the laser scanner.

Additionally, there may be provision for the reference intensity value to be prescribed initially. As such, the reference intensity value may already be present when the laser scanner is manufactured or delivered, for example. The reference intensity value may be stored in the laser scanner or an evaluation unit connected to the laser scanner, for example. As a result, the reference intensity value can be prescribed easily and so as to be available at all times.

In a further embodiment, there is preferably provision for the reference intensity value to be adapted at predetermined intervals during operation of the laser scanner. It is thus possible for the reference intensity value to be adapted to suit empirical values relating to the functional impairment, for example. The reference intensity value can alternatively be adapted to whether the functional impairment of the laser scanner has a high or a low probability value for the accuracy of detection of the functional impairment, for example. The adaptation of the reference intensity value during operation of the laser scanner thus allows the functional impairment of the laser scanner to be detected at diverse accuracy levels.

Additionally, there may be provision for the adaptation of the reference intensity value to be performed on the basis of a plurality of intensity values obtained from echos from the protective screen during operation of the laser scanner. As a result, the intensity value can be adapted on the basis of empirical values. It may thus be the case, by way of example, that the protective screen is subject to a certain ageing process as a result of which the reference intensity value needs adaptation, since otherwise the deposit of the particles would be detected even though it is not present. It is advantageous that the adaptation of the reference intensity value on the basis of the intensity values obtained allow detection of the functional impairment effectively and precisely over the entire life of the laser scanner.

Preferably, there is provision for a value difference in the intensity value from the reference intensity value to be determined, and for a probability of functional impairment of the laser scanner to be determined on the basis of the difference. Thus, by way of example, a small value difference can indicate that the functional impairment of the laser scanner is detected erroneously or at least that the functional impairment of the laser scanner is not serious. A large value difference can indicate a high level of certainty, for example, and therefore can have a high probability of indicating the erroneous detection of the functional impairment. As a result of the value difference between the intensity value and the reference intensity value being taken into consideration, the functional impairment of the laser scanner is detected more reliably.

The invention also relates to a laser scanner for a motor vehicle having, in particular, a motor vehicle mounting element, a protective screen, a transmission unit, a reception unit and an evaluation unit. The laser scanner is configured to perform a method according to the invention. The motor vehicle mounting element is used to mount the laser scanner on the motor vehicle. The protective screen is preferably part of a housing of the laser scanner and is used to delimit an interior of the housing from an outside area of the housing or a surrounding area of the motor vehicle. The transmission unit transmits a laser beam, which is then received by the reception unit.

Preferably, there is provision for the laser scanner to comprise a moving deflection mirror by virtue of which a laser beam transmitted in a surrounding area of the motor vehicle by means of the transmission unit is deflectable. The deflected laser beam then allows multiple objects in the surrounding area to be scanned in succession, for example. The deflection mirror deflects the laser beam effectively and precisely, so that a distance from a respective object in the surrounding area can be determined accurately.

In particular, there is provision for the laser scanner to be configured with at least two reception channels, in particular of the reception unit, to receive at least two echos of a laser beam transmitted into a surrounding area of the motor vehicle. As a result, the reception unit has the at least two reception channels, in particular, and this allows a distance from an object in the surrounding area to be determined using the same laser beam as also provides an echo from the protective screen. The preferable configuration of the reception unit with the at least two reception channels in turn allows the laser scanner to be configured to have fewer components than if multiple reception units were provided in the laser scanner.

The invention also relates to a motor vehicle having a laser scanner according to the invention.

The preferred embodiments presented with reference to the method according to the invention and the advantages of said embodiments apply accordingly to the laser scanner according to the invention and to the motor vehicle according to the invention.

Further features of the invention are obtained from the claims, the figures and the description of the figures. The features and combinations of features cited in the description above and the features and combinations of features cited in the description of the figures below and/or in the figures alone can be used not only in the respectively indicated combination but also in other combinations or on their own without departing from the scope of the invention. Therefore, embodiments of the invention that are not shown and explained explicitly in the figures, but emerge and are producible from the explained embodiments by virtue of separate combinations of features, can also be regarded as covered and disclosed. Embodiments and combinations of features that therefore do not have all the features of an originally formulated independent claim can also be regarded as disclosed. Furthermore, embodiments and combinations of features that go beyond or differ from the combinations of features set out in the back-references of the claims can be regarded as disclosed, in particular as a result of the embodiments set out above.

The exemplary embodiments of the invention are explained in more detail below with reference to schematic drawings, in which.

In the figures, elements that are the same or have the same function are provided with the same reference symbols.

Figure 1:
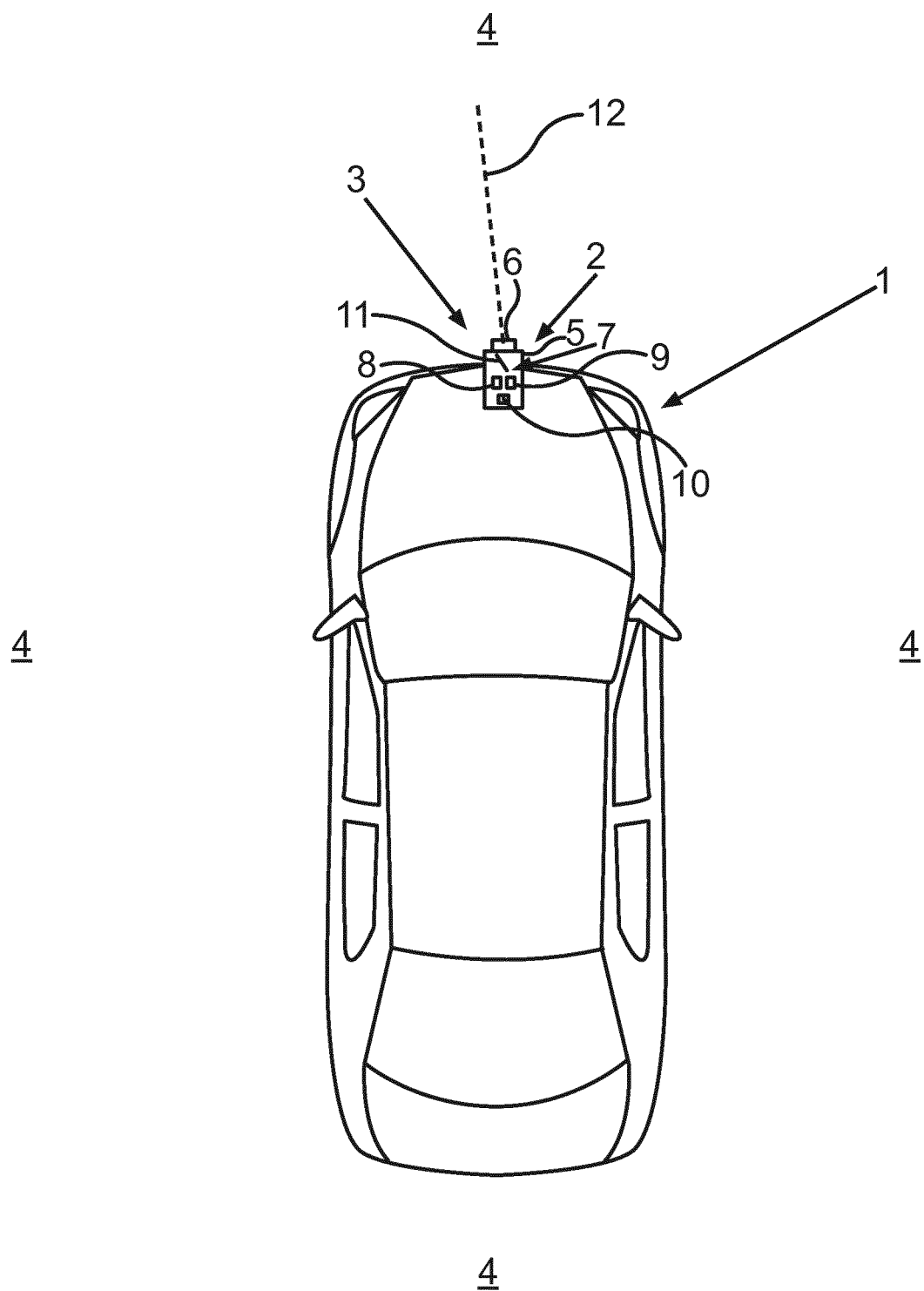
FIG. 1 shows a schematic plan view of an exemplary embodiment of a motor vehicle according to the invention with a laser scanner.

FIG. 1 schematically depicts a motor vehicle 1 with a laser scanner 2. The laser scanner 2 is arranged on a front 3 of the motor vehicle 1. The arrangement of the laser scanner 2 on the motor vehicle 1 is possible in many and diverse ways, however, but preferably such that a surrounding area 4 of the motor vehicle 1 can be picked up at least in part.

The laser scanner 2 has a housing 5 and a protective screen 6. An inside 7 of the housing 5 has a transmission unit 8, a reception unit 9, an evaluation unit 10 and a deflection mirror 11 arranged in it.

The transmission unit 8 transmits a laser beam 12 via the deflection mirror 11 and through the protective screen 6 into the surrounding area 4. The deflection mirror 11 is movable in order to deflect the laser beam and to radiate it into the surrounding area 4 at different locations.

As shown in FIG. 1, the evaluation unit 10 may be arranged in the housing 5 of the laser scanner 2 or else be present as a separate unit outside the housing 5.

The protective screen 6 may be part of the housing 5, for example. The protective screen 6 prevents undesirable particles from entering the insider 7 of the housing 5. The protective screen 6 is configured to be at least semitransparent in the frequency range of the laser beam 12. This means that the laser beam 12 can radiate through the protective screen 6 at least in part.

Figure 2:
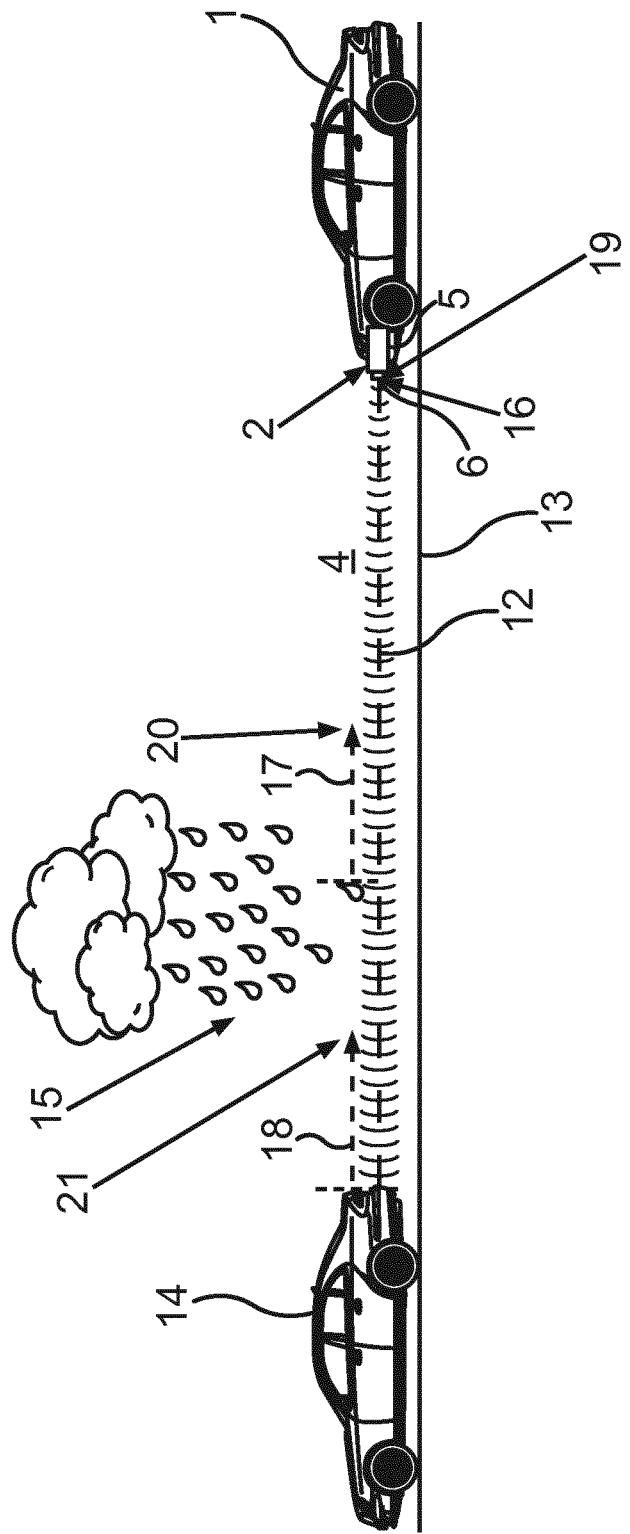
FIG. 2 shows a schematic depiction of the motor vehicle and a further motor vehicle present in a surrounding area of the motor vehicle.

FIG. 2 shows the motor vehicle 1 with the laser scanner 2 on a road 13. In front of the motor vehicle 1 on the road 13 is an object 14. The object 14 is configured as a further motor vehicle based on FIG. 2. The object 14 is in the surrounding area 4 of the motor vehicle 1. There are rain drops 15 between the motor vehicle 1 and the object 14.

The laser scanner 2 uses the transmission unit 8 to transmit the laser beam 12 into the surrounding area 4 to the object 14. The laser beam 12 has at least a proportion reflected at the protective screen 6 with a first echo 16. Additionally, the laser beam 12, after passing through the protective screen, has at least a proportion reflected at the rain drops 15 with a second echo 17 and then the laser beam 12 is reflected at the object 14 with a third echo 18. The echos 16, 17, 18 are received by the reception unit 9. The first echo 16 has a first intensity value 19, the second echo 17 has a second intensity value 20 and the third echo 18 has a third intensity value 21. The intensity values 19, 20, 21 are determined in particular at a respective time at which the echos 16, 17, 18 are received by the reception unit 9.

Figure 3:
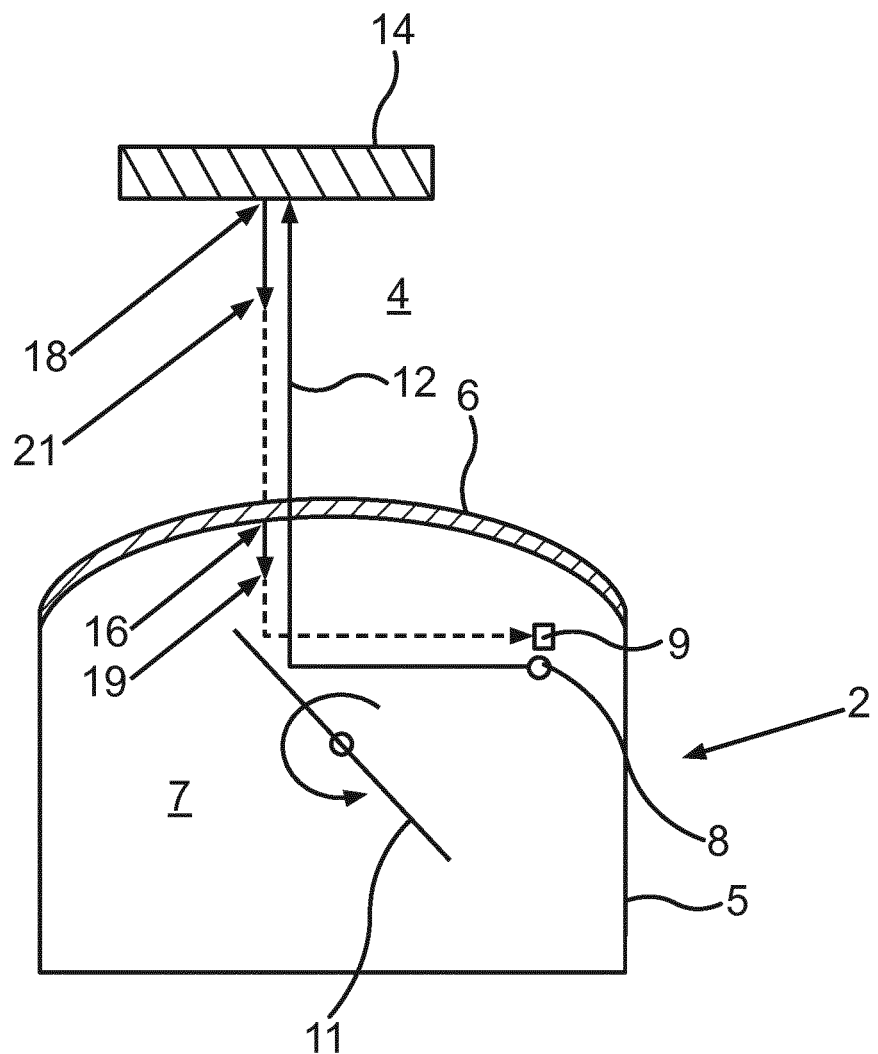
FIG. 3 shows a schematic depiction of the laser scanner with a transmission unit, a reception unit, a deflection mirror and a protective screen.

FIG. 3 shows the laser scanner 2. The transmission unit 8 is used to transmit the laser beam 12 into the surrounding area 4 to the object 14. The laser beam 12 is reflected at the object 14 and received by the reception unit 9 as the third echo 18. The laser beam 12 is radiated through the protective screen 6 both on transmission and on reception. Similarly, the laser beam 12 is deflected via the deflection mirror 11 both on transmission and on reception. The deflection by means of the deflection mirror 11 steers the laser beam 12 from the transmission unit 8 to the object 14, and the reflection of the laser beam 8 is steered from the object 14 via the deflection mirror 11 back to the reception unit 9. The sensor screen 6 does not have a separate reference target or optical element in this case in order to deflect the laser beam 12 at least in part or to split off a portion of the laser beam 12.

Figure 4:
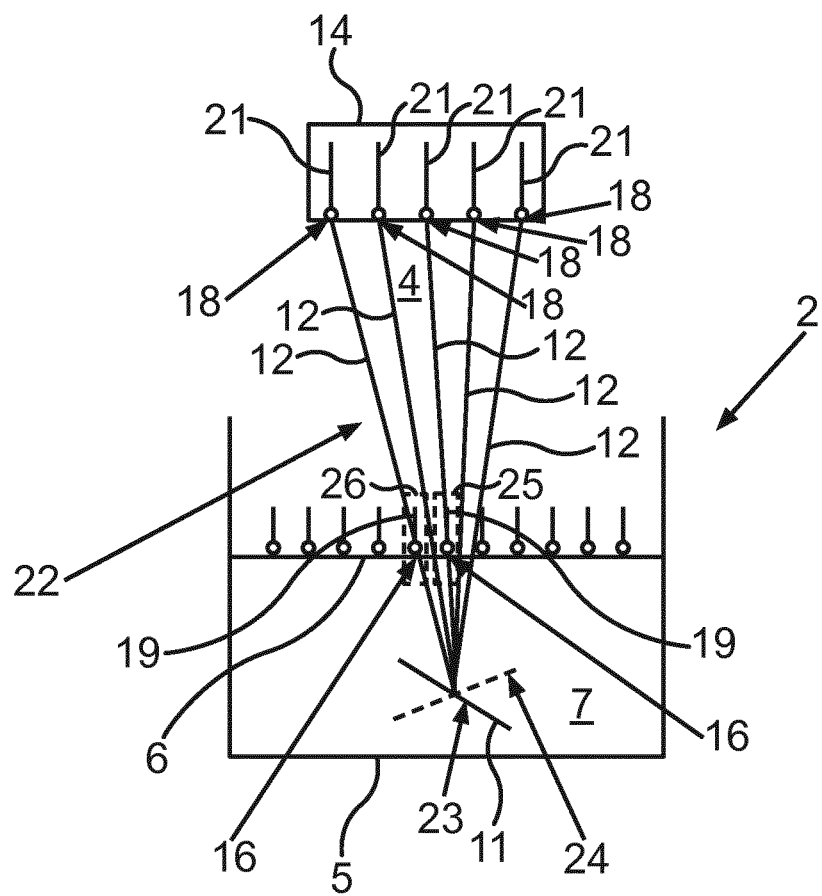
FIG. 4 shows a schematic depiction of multiple laser beams and the associated echos with the respective intensity values.

FIG. 4 shows the laser scanner 2 without functional impairment. There is no deposit of particles on the protective screen 6. A plurality of laser beams 22 are transmitted into the surrounding area 4. Each laser beam 12 of the plurality of laser beams 22 is transmitted into the surrounding area 4 with a different attitude of the deflection mirror 11. Thus, the deflection mirror 11, according to the exemplary embodiment, is at least in a first position 23 and in a second position 24. The different positions 23, 24 radiate the respective laser beam 12 of the plurality of laser beams 22 in different areas of the protective screen 6. Thus, the laser beam 12 is radiated through a first area 25 of the protective screen 6 during the first position 23 of the deflection mirror 11, while the laser beam 12 is radiated through a second area 26 of the protective screen 6 with the deflection mirror 11 in the second position 24.

This thus means that both the first echo 16 is produced in the first area 25 and, when the laser beam 12 is transmitted again, the first echo 16 is also produced in the second area 26 of the protective screen 6. Also, the transmission of the laser beam 12 results in the third echo 18 at the object 14, and the fresh transmission of the laser beam 12 again results in the third echo 18 at a different point on the object 14. The repeated transmission of the laser beam 12 thus scans not only the object 14 but also the protective screen 6 in the at least two areas 25, 26. As a result, the first echo 16 from the protective screen 6 is present both for the first area 25 and for the second area 26. Therefore, the first intensity intensity value 19 of the first echo 16 is also present for the first area 25 and, after fresh transmission of the laser beam 12, the first intensity value 19 is present with a different value or with the same value for the echo 16 in the second area 26 of the protective screen 6.

Figure 5:
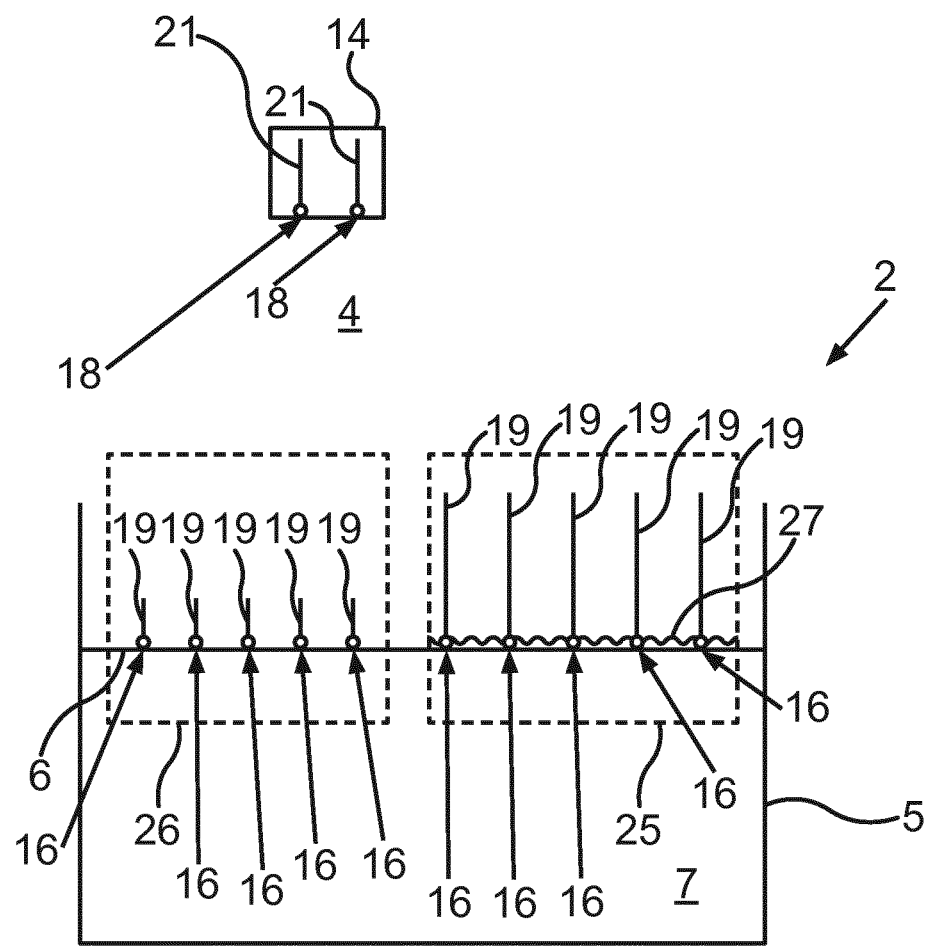
FIG. 5 shows a schematic depiction analogous to FIG. 4 and to a deposit of particles in a first area of the protective screen.

FIG. 5 shows the laser scanner 2 with the protective screen 6 soiled in the first area 25. There is thus a deposit of particles 27 present in the first area 25 of the protective screen 6. The second area 26 has no deposit of particles 27. The first intensity value 19 of the first echo 16 at the protective screen 6 within the first area 25 is accordingly higher than the first intensity value 19 of the first echo 16 within the second area 26. In the second area 26, the laser beam 12 can pass through the protective screen 6 with more photons than is the case in the first area 25. Therefore, the first echo 16 has a higher first intensity value 19 in the first area 25 than the first echo 16 in the second area 26. The first intensity value 19 of the first echo 16 in the first area 25 is different from a reference intensity value. On the basis of the reference intensity value, it is now possible for the deposit of the particles 27 on the protective screen 6 to be detected. The first intensity values 19 thus allow the laser scanner 2 to be described in regard to its functional impairment or its functional status.

Figure 6:
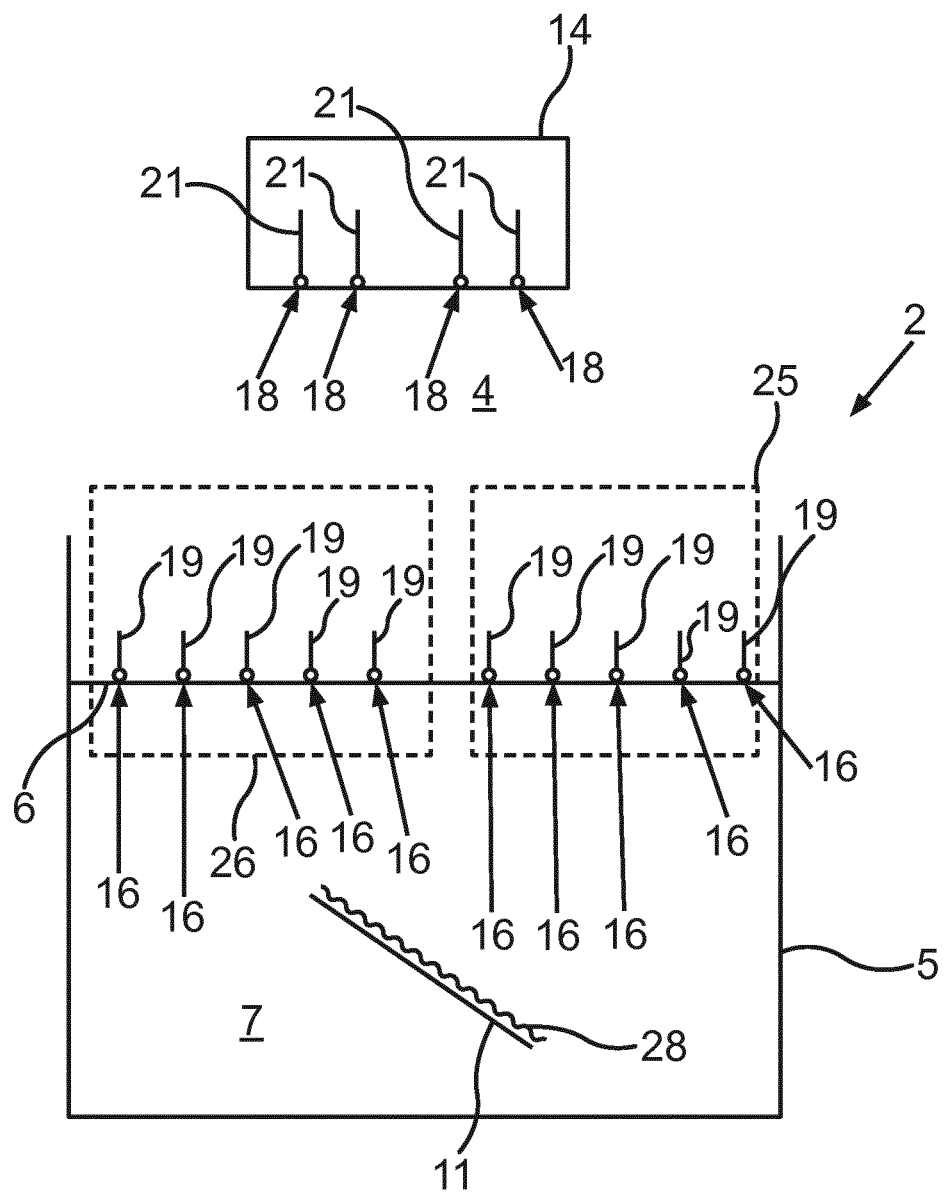
FIG. 6 shows a schematic depiction analogous to FIG. 4 and to a tarnished deflection mirror of the laser scanner.

FIG. 6 shows the laser scanner 2, in which the first intensity value 19 in the first area 25 and in the second area 26 is lower than the reference intensity value. As a result, a tarnish from moisture 28 on the deflection mirror 11 is detected. On account of the moisture 28 on the deflection mirror 11, the laser beam 12, after transmission by the transmission unit 8, is forwarded by the deflection mirror 11 only with a lower intensity value, since the moisture 28 results in the laser beam 12 being reflected more diffusely from the deflection mirror 11. Therefore, the respective first echo 16 is also received by the reception unit 9 with a lower first intensity value 19 than would be the case with a deflection mirror 11 without the moisture 28. An indication of the deposit of the moisture 28 on the deflection mirror 11 is provided first by the first lower intensity value 19 in comparison with the reference intensity value and secondly also by the lower first intensity value 19 within the first area 25 and the second area 26 at the same time. Whereas the deposit of the particles 27 frequently occurs only locally on the protective screen 11, the tarnish with the moisture 28 in particular affects all areas 25, 26 of the protective screen 6.

As such, an exemplary embodiment of the method proceeds as follows, for example. The transmission unit 8 transmits the laser beam 12 to the deflection mirror 11. The deflection mirror 11 reflects the laser beam 12 to the protective screen 6. At the protective screen 6, a portion of the laser beam 12 is reflected back to the deflection mirror 11 as the first echo 16. From there, the first echo 16 is reflected to the reception unit 9, and the first intensity value 19 of the first echo 16 is determined. The first intensity value 19 of the first echo 16 is then compared with the reference intensity value. If the first intensity value 19 is greater than the reference intensity value, the deposit of the particles 27 on the protective screen 6 is assumed. If the first intensity value 19 is less than the reference intensity value, the tarnishing of the deflection mirror 11 with the moisture 28 is assumed. In a further step, the deflection mirror 11 is moved form first position 23 into the second position 24 and the laser beam 12 is transmitted into the surrounding area 4 again by means of the transmission unit 8. When the laser beam 12 is transmitted gain, it now passes through the protective screen 6 no longer in the first area 25, but rather in the second area 26. This also produces the first echo 16 in the second area 26 instead of in the first area 25. It is therefore possible for the second area 26 also to be examined for the deposit of the particles 27.

Whereas the first echo 16 is evaluated for the functional impairment of the laser scanner 2, the further echos 17, 18 of the laser beam 12 are nevertheless received from the surrounding area 4 by the reception unit 9 and evaluated. Therefore, during operation of the laser scanner 2, that is to say the determination of distance from the object 14, it is also additionally possible for the functional impairment of the laser scanner 2 to be detected on the basis of the first echo 16.

The first echo 16 on the protective screen 6, that is to say the reflection of the laser beam 12 on the side of the protective screen 6 that faces the deflection mirror 11, occurs without a separate optical element, which is supposed to deflect the laser beam 12 or split a proportion thereof, being provided on the protective screen 6 or at a distance form the protective screen 6. The first echo 16 is produced on the basis of the reflection of the laser beam 12 at the interface between air from the inside 7 of the housing 5 and the inner side of the protective screen 6. The interface is located in particular between two nonabsorbent media with different magnitudes of propagation speed for the laser beam 12. The two nonabsorbent media in the present case are the protective screen 6 and the air in the inside 7 of the housing 5. The propagation speed of the laser beam 12 within the protective screen 6 is different from the propagation speed within the air in the inside 7 of the housing 5.

The invention claimed is:

1. A method for detecting functional impairment of a laser scanner of a motor vehicle, the method comprising:
   transmitting a laser beam of the laser scanner through a protective screen of the laser scanner into a surrounding area of the motor vehicle;
   receiving an echo of the transmitted laser beam at least partially reflected at the protective screen by a reception unit of the laser scanner with an intensity value; and
   detecting the functional impairment of the laser scanner when the intensity value is different from a reference intensity value,
   wherein the reference intensity value is adapted at predetermined intervals during operation of the laser scanner, and
   wherein the adaptation of the reference intensity value is performed on a basis of a plurality of intensity values obtained from echoes from the protective screen during operation of the laser scanner.

2. The method according to claim 1, wherein the echo is assigned as the echo reflected from the protective screen on a basis of its delay from a transmission unit of the laser scanner, which transmits the laser beam, to the protective screen and back to a reception unit of the laser scanner.

3. The method according to claim 1, wherein the functional impairment is detected as a deposit of particles on the protective screen if the intensity value is greater than the reference intensity value.

4. The method according to claim 3, wherein the deposit of the particles in a first area of the protective screen is detected if a deflection mirror of the laser scanner is oriented in a first position, and the deposit of the particles in a second area of the protective screen is detected if the deflection mirror is oriented in a second position, which is different from the first position.

5. The method according to claim 1, wherein the laser beam is reflected at a deflection mirror of the laser scanner at least after transmission, and the functional impairment is that the deflection mirror is detected as tarnished if the intensity value is less than the reference intensity.

6. The method according to claim 1, wherein at least one further echo of the transmitted laser beam reflected at an object in the surrounding area is received by the reception unit with a further intensity value.

7. The method according to claim 1, wherein the reference intensity value is prescribed initially.

8. The method according to claim 1, wherein a value difference in the intensity value from the reference intensity value is determined, and a probability of functional impairment of the laser scanner is determined on a basis of the difference.

9. A laser scanner for a motor vehicle comprising:

a protective screen;

a transmission unit;

a reception unit; and an evaluation unit, which is configured to perform a method according to claim 1.

10. The laser scanner according to claim 9, further comprising a moving deflection mirror by virtue of which a laser beam transmitted into a surrounding area of the motor vehicle by the transmission unit is deflectable.

11. The laser scanner according to claim 9, wherein the laser scanner is configured with at least two reception channels of the reception unit, to receive at least two echoes of a laser beam transmitted into a surrounding area of the motor vehicle.

12. A motor vehicle having a laser scanner according to claim 9.

* * * * *